Aug. 7, 1962 A. C. LOEDDING 3,048,357
WINGLET DROGUE FOR AERIAL REFUELING
Filed March 23, 1961 5 Sheets-Sheet 3
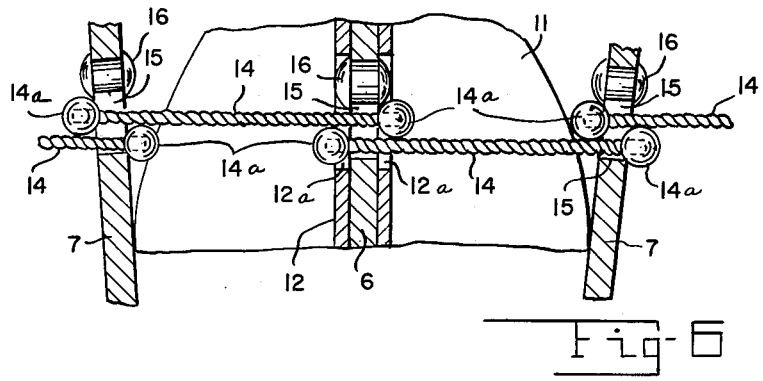
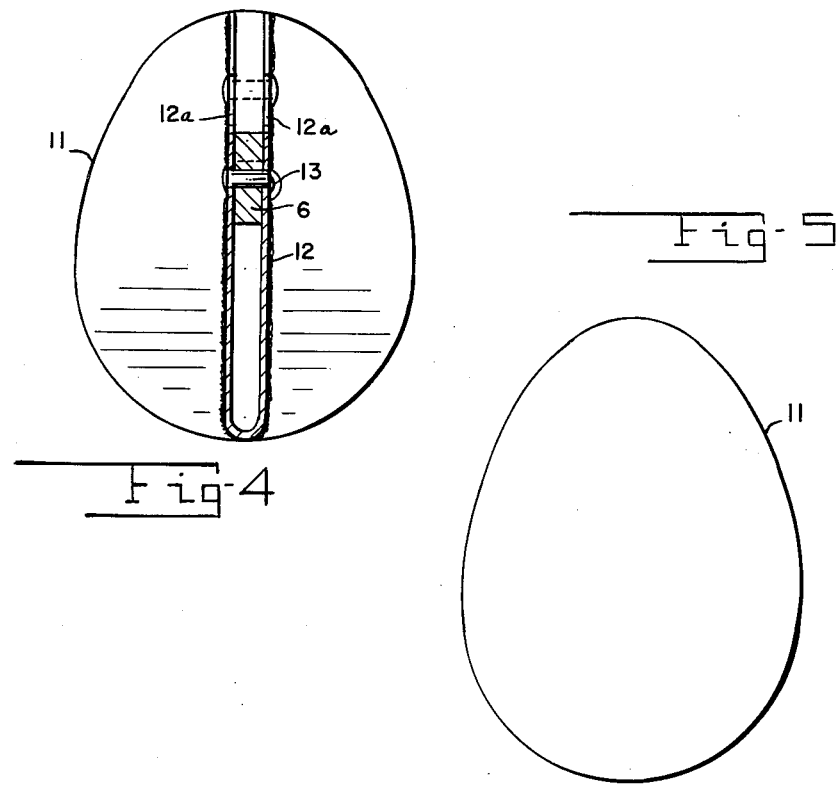
*INVENTOR.*
ALFRED C. LOEDDING
BY
ATTORNEYS

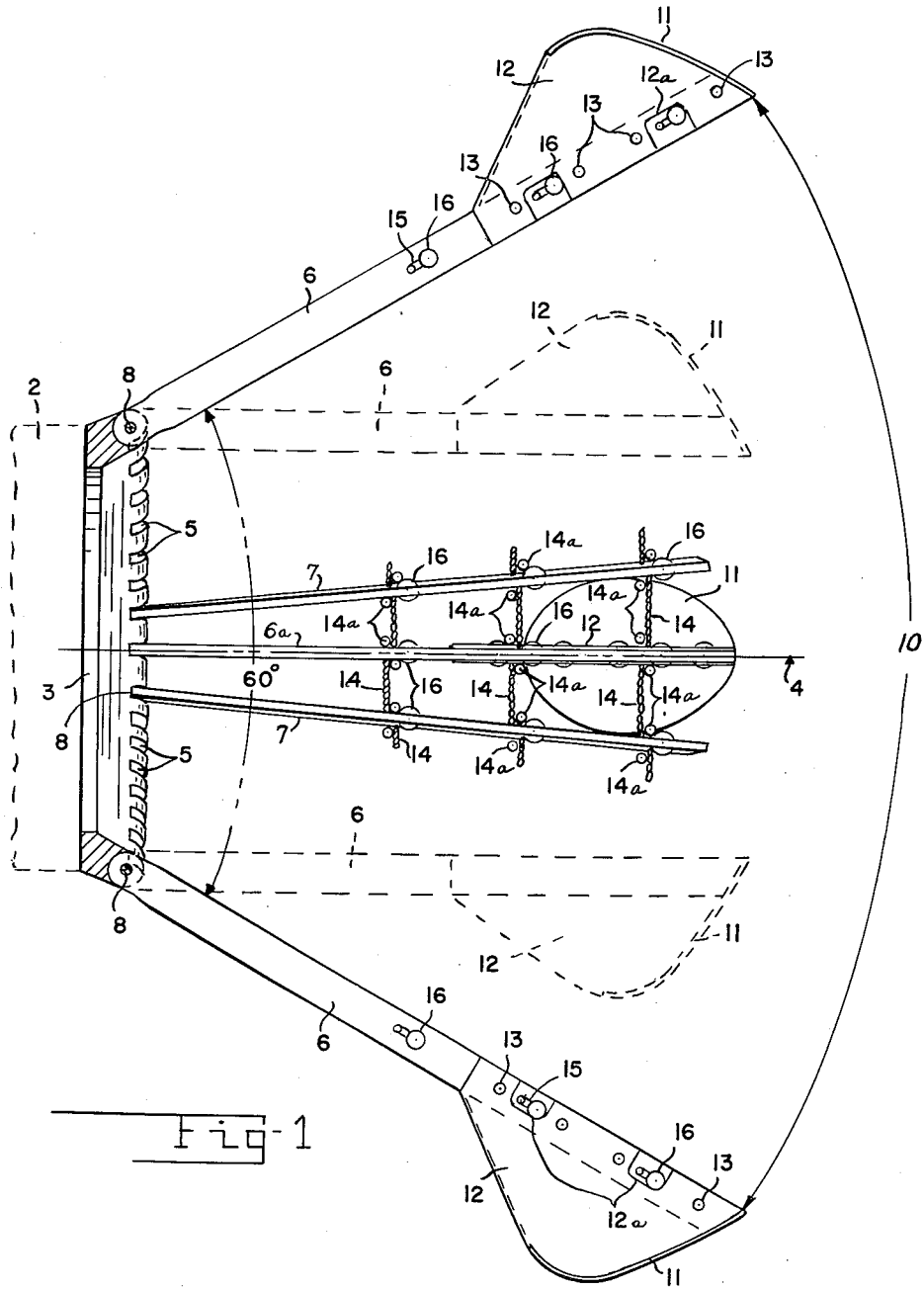

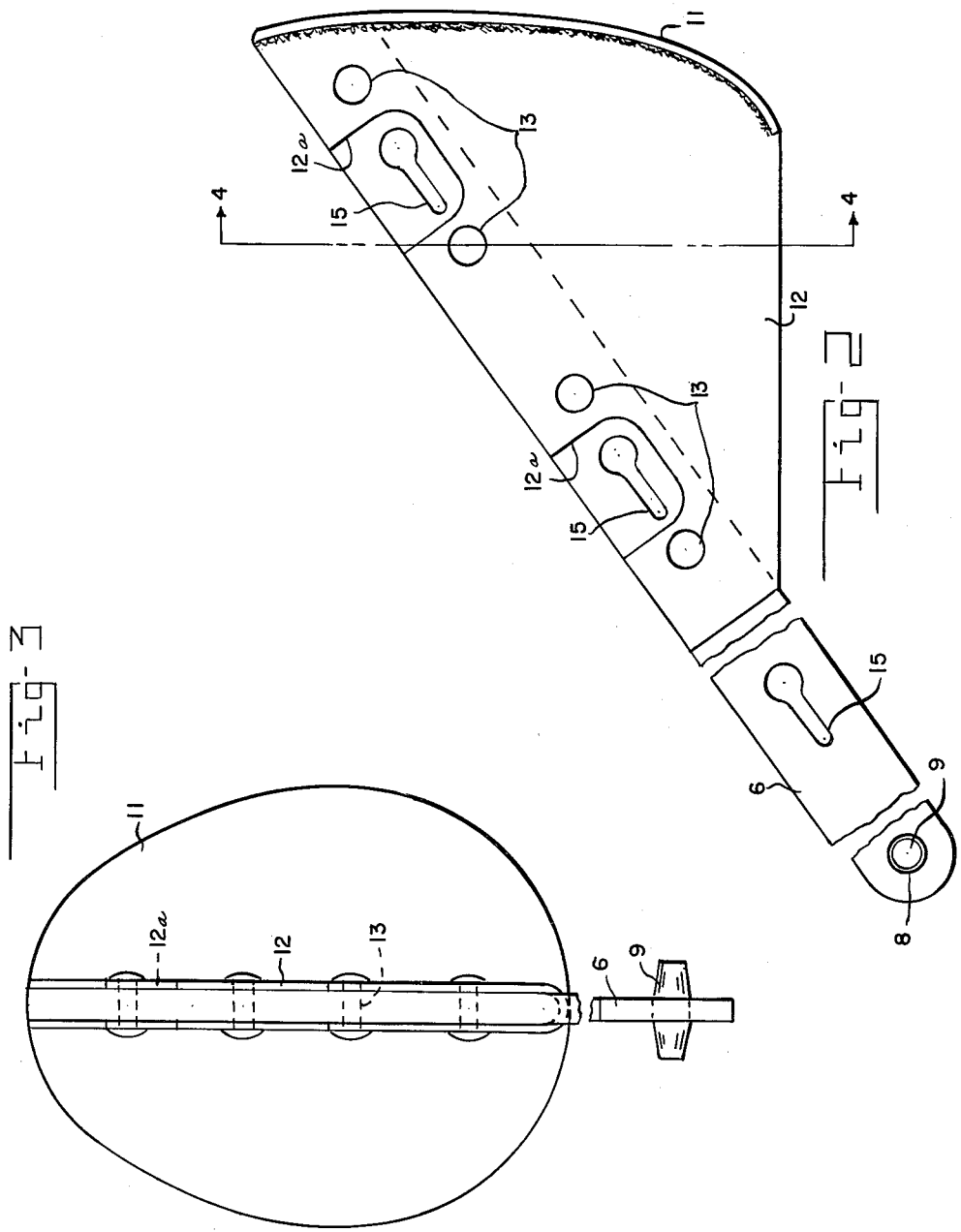

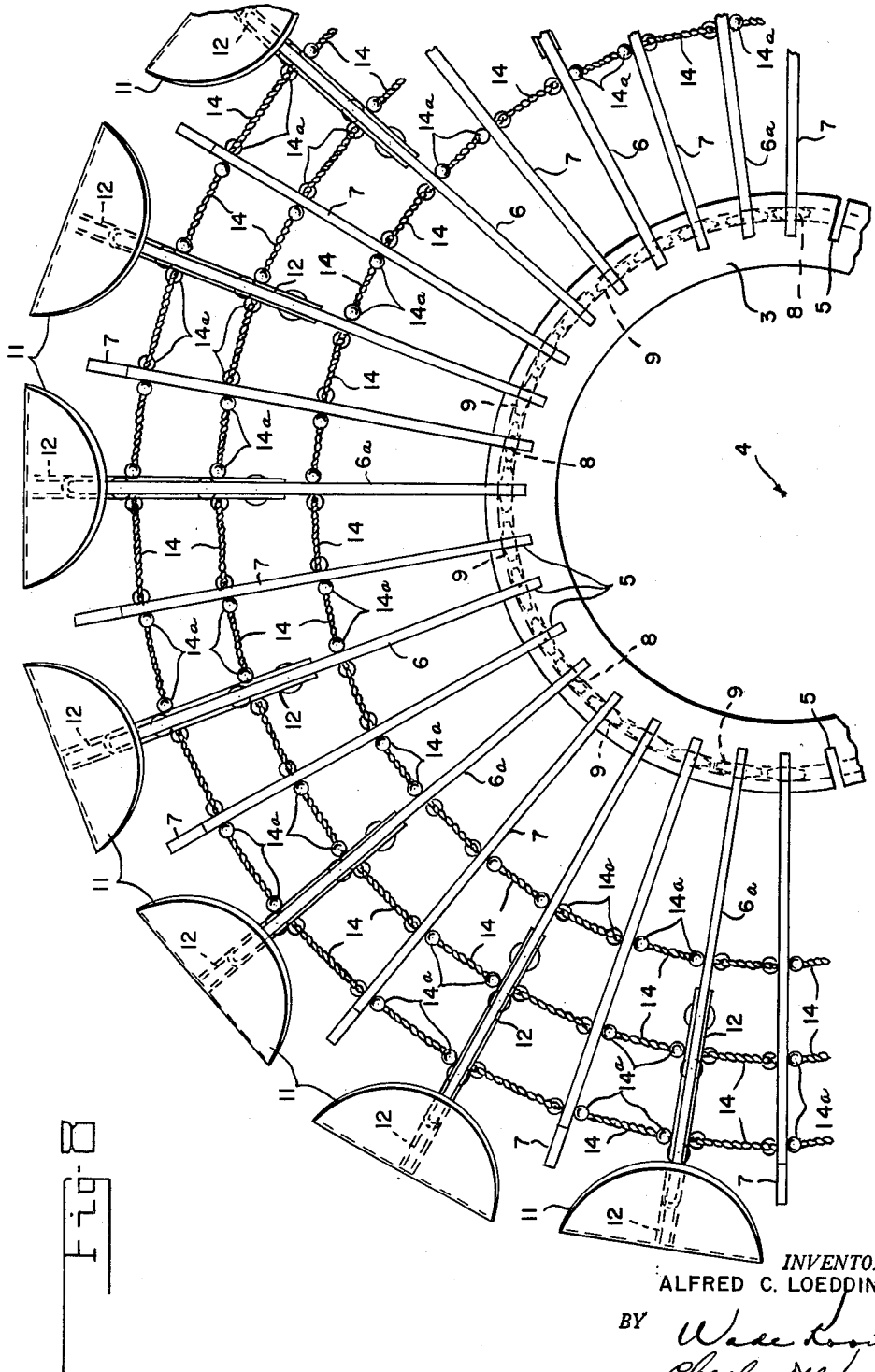

United States Patent Office 3,048,357
Patented Aug. 7, 1962

3,048,357
WINGLET DROGUE FOR AERIAL REFUELING
Alfred C. Loedding, Williamsburg, Va., assignor to the United States of America as represented by the Secretary of the Air Force
Filed Mar. 23, 1961, Ser. No. 97,975
10 Claims. (Cl. 244—135)
(Granted under Title 35, U.S. Code (1952), sec. 266)

The invention described herein may be manufactured and used by or for the United States Government for governmental purposes without the payment to me of any royalty thereon.

This invention relates to aerial refueling devices or systems for accomplishing a "hook-up" of an aerial refueling system between a tanker aircraft and a receiver aircraft, and more particularly to an improved drogue device for the tanker aircraft to accomplish the reception and coupling of the receiver probe device, whereby the transfer of fuel or other liquid from a tanker aircraft to receiver aircraft is accomplished.

The term "drogue" has been applied generally to any device attached to one end of an aerial refueling system employing a boom type connection, or a hose type connection, the drogue device providing aerodynamic drag to start a hose reeled up inside of an external store, or inside of the fuselage, out into the airstream whereby the combined air drag on the hose and the drogue will complete the extension of the system which is necessary before the starting of the engaging and fuel transfer operation between the drogue and the probe members.

In previous systems it has been difficult and sometimes impossible to completely stabilize the delivery hose of a hose type system against "hose shake" or "flag waving" and hose whip action in the airstream, particularly under turbulent air conditions during engagement and also as the probe member and drogue members are being brought into fuel delivery relation. Hose whip can cause extensive damage or destruction of either the tanker or the receiver systems, and quite frequently destruction of both systems, and even the aircraft itself. Hose shake usually causes a disconnect, but not always damage, so that another hook-up can be made.

The drogue member should be collapsible when not in use and expandable to provide a conical or funnel shape probe receiving opening when the delivery system is extended to receive the probe member, for guiding the same into fuel delivery position in the airstream, also considerable drag must be provided by the drogue member to permit the probe of the receiver to push against the tanker's receptacle locking force (that keeps the fuel from leaking) and thus permits a secure engagement so that fuel can be safely passed at a high rate; for instance, about 1200 gallons per minute.

An object of the present invention is the provision of a drogue device for an aerial refueling system which is aerodynamically stabilized against "hose-shake," "flag-waving" and "hose-whip."

A further object is the provision of an expandable drogue member which provides steady and certain reception and guidance for the receiver's probe to assure a quick and safe hook-up, especially under adverse weather or turbulent air conditions and which is not affected by the receiver's forward pressure or bow wave, to prevent the drogue member from suddenly darting to one side as the probe member is about to make contact in the drogue member.

A still further object is the provision of an expandable drogue member for the reception of a probe member in which said drogue is stabilized by a plurality of aerodynamic winglet surfaces circumferentially spaced around the probe receiving axis of the drogue, having an aspect ratio less than 1.5 and a positive camber relative to said axis for directing the air passing said drogue device radially inward toward said axis and exerting outward force and drag on said expandable drogue member for expansion thereof into probe receiving condition.

A still further object is the provision of a drogue member for receiving a probe member therein having a plurality of elongated strut members which are pivoted at one end in circumferentially spaced relation about the probe receiving axis for inward and outward swinging movements between a retracted position substantially parallel to the probe receiving axis to an expanded conical probe receiving area concentric to said axis, in which the free ends of the strut members each have an air foil winglet fixed thereon remote from the central axis, having an aspect ratio less than 1.5 with a camber relative to said axis, disposed at a substantially maximum angle of attack of the airstream passing said drogue device in its retracted condition for exerting material outward lift and drag on said strut members in their retracted positions and urging said drogue device in the direction of the air passing the drogue device, and for expanding the strut members outwardly into the conical probe receiving area.

A further object is the provision of extensible means connecting said strut members together around said axis for limiting the outward swinging movement of said strut members to said conical probe receiving area.

A further object is the provision of a drogue member in which the struts are spaced circumferentially from each other around said axis to provide the pilot of the drogue carrying aircraft with substantially unobstructed vision through the drogue device between the struts, during the reception and coupling therein of the probe member.

A still further object is the disposition of the air foil winglet members on the struts in overlapping relation when the drogue member is in contracted condition.

A still further object includes probe deflector ribs pivoted to the drogue member similar to the strut members for simultaneous similar swinging movement with said strut members, to provide additional probe guiding means between said strut members for completing said conical probe receiving area, and extensible connecting means extending concentrically around the probe receiving axis, slidably connecting said strut and rib members together for limiting the outward swinging movement of said strut and rib members to said conical probe receiving area.

Other objects and advantages of the invention will become apparent from the following description and accompanying drawings in which like reference characters refer to like parts in the several figures of the drawing.

In the drawing:

FIG. 1 is a transverse, vertical, longitudinal, sectional view through my improved drogue device; however, certain of the strut members and the attached airfoil winglet members have been omitted for clearness and to avoid confusion in the illustration. The upper and lower struts and winglets being shown in side elevation in full lines in their extended positions, and in dotted outlines in their substantially retracted position, also one of the strut and winglet members in line with the probe receiving axis is shown in elevation with its associated rib members and the flexible, extensible connector means between the struts and the ribs being shown in their extended relation;

FIG. 2 is an enlarged side elevation of one of the pivoted strut and winglet members, the strut portion being broken away and foreshortened:

FIG. 3 is an end elevation of the strut and winglet device shown in FIG. 2, looking toward the pivot end thereof;

FIG. 4 is a sectional view taken about on the plane indicated by line 4—4 in FIG. 2;

FIG. 5 is a plan view of the blank plate from which the winglet member if formed;

Figure 7:
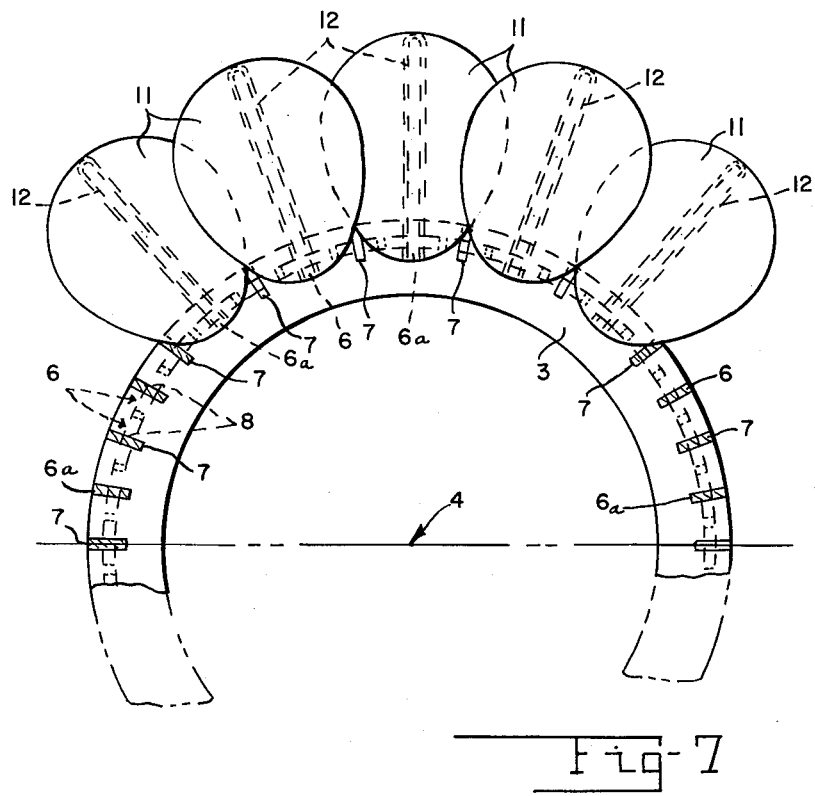

FIG. 6 is an enlarged fragmentary longitudinal sectional view taken through one of the strut members and its adjacent rib members, taken about on the plane indicated by the line 6—6 in FIG. 1 and looking in the direction of the arrows, illustrating more clearly the extensible connectors between the strut and rib members, and the rivet means for retaining the same in the bayonet slots in the strut and rib members, for limiting the expansion of the strut members by the winglet members;

FIG. 7 is a fragmentary end view of my improved drogue device, looking toward the probe receiving opening, and showing a few of the rib and winglet carrying strut members in their contracted or retracted condition, showing the overlapping relation of the winglet members, when in this retracted condition; and FIG. 8 is a similar fragmentary end view of the drogue device, but showing the rib and winglet carrying strut members in their expanded, probe receiving relation.

In the drawing, particularly FIG. 1, the reference numeral 1 denotes my improved drogue device generally, mounted on a probe receiving member 2 of an aerial refueling system, such as a refueling boom from a "tanker" aircraft, or a fuel delivery hose, which is withdrawn; for instance, from a suitable conventional reel carried by a "tanker" aircraft.

An annular support or ring member 3 is fixed to the outer extremity of the fuel delivery boom or hose member 2, perpendicular to the refueling and probe receiving axis 4. The support member 3 is circular and concentric to the refueling and probe receiving axis 4 and is suitably slotted as shown at 5 in uniform circumferentially spaced points around the axis 4 to receive a plurality of swingable long and short elongated strut members 6 and 6ᵃ, and intermediate elongated rib members 7.

The strut and rib members 6, 6ᵃ and 7 are pivoted to the annular support 3 in the slots 5 at 8 in any suitable manner. One method being that of providing pivot pins 9 in the inner ends of the struts and ribs, and providing cap members for retaining the pins in the slots 5, in which event the caps are suitably secured to the ring; for instance, by bolts or other fastening means.

The strut members 6 and 6ᵃ and the rib members 7 being pivoted to the supporting ring 3, are swingable between retracted positions as shown in dotted lines in FIG. 1, and in full lines in FIG. 7, substantially parallel to the probe receiving axis 4, and extended positions, as seen in full lines in FIG. 1 and FIG. 8 to provide a conical probe receiving area indicated at 10, of about 60°, for the reception and guidance of the probe member of the receiver aircraft into conventional (leak tight) fuel delivery relation.

Secured in fixed relation to the outer end portion of each of the strut members 6 and 6ᵃ is an airfoil wing member 11, herein also referred to as a "winglet" member 11. These wings or winglet members 11 are disposed on the radially remote sides of the strut members 6 and 6ᵃ, and each comprises an elliptical shaped plate 11, as seen in FIG. 5, being curved longitudinally to form small wing-like structures having a very low aspect ratio of below 1.25 which, according to the well known "Characteristics of Clark Y Airfoils of Small Aspect Ratio by C. H. Zimmerman, Investigated in 1932." NACA T431, provides a lift curve varying from about 0° angle of attack to nearly 50° angle of attack before "stall."

The winglet members 11 are disposed on the outer end portions of the long and short strut members 6 and 6ᵃ, outside or remote from the conical confines of the struts and ribs forming the aforesaid probe receiving area, as seen in FIGS. 7 and 8, as well as in FIG. 2. They are welded or otherwise fixed to U-shaped hollow bracket members 12, best seen in FIG. 4, straddling the strut members as shown, and fixed in place on the struts by the rivets 13.

The winglet members 11, because of the long and short strut mountings, move into circular overlapping relation in their retracted condition, as seen in FIG. 7, when the strut members are swung or cammed inwardly into positions substantially parallel to the probe receiving axis 4 as, for instance, when the drogue device is withdrawn or retracted to its nonoperative position in the tanker aircraft. In this position the struts and ribs extend straight back about parallel to the airstream passing the drogue device and the winglet members 11 are disposed in overlapping relation at a large angle of attack of about 45°, or nearly maximum, the winglet members 11 being formed with a positive outer curvature and a negative inner curvature relative to the axis 4 and the airstream passing the exterior of the drogue device.

The ribs and struts are swingable outwardly from their retracted positions to provide a probe gathering or receiving included angle of about 60°, concentric to the said axis 4, the winglets or airfoils have an angle of substantially 45° relative to the axes of the arms 6—6ᵃ, the winglet angle of attack relation becoming reduced, with the expansion of the free ends of the struts and ribs, to an appreciable angle of attack of about 15°; however, since the winglets 11 separate from their overlapping relation as they move to their outwardly expanded relation, considerable outward lift and drag is still produced on the drogue device in its expanded position.

Because of the spread in the lift range, because of the low aspect ratio of the winglets, the winglet surfaces are capable of exerting a considerable (outward) lift or unfolding action and drag on the struts from the collapsed positions, approximately straight back parallel to the airstream where the winglets are at a large or substantially maximum angle of attack, about 45°, to the expanded positions where the struts (and ribs) form the probe receiving and guiding included angle of 60°, where the winglets are at an angle of attack of roughly 15°. This angle (geometric) of 15° is the minimum angle of attack of the winglet, considering it as a wing, but the operating angle of attack with respect to the resultant airstream passing the exterior of the probe receiving receptacle, struts, ribs, receptacle housing, is considerably greater than the aforesaid (geometric) angle of attack of 15°, and averages out about 25°, or substantially midway between zero lift and stalling angle of the winglet.

The U-shaped bracket members 12 are each provided with cutaway portions 12ᵃ at opposite sides thereof for exposing the opposite sides of the strut members to accommodate a plurality of flexible extensible and retractable connecting members 14, extending between the rib and strut members 7 and 6 and 6ᵃ and extending circumferentially around the probe receiving axis 4, for controlling and limiting the outward swinging movement of the strut and rib members to the aforementioned conical probe receiving area 10.

As best seen in FIGS. 1, 2, 6 and 8 there are three extensible and retractable concentric bands of the members 14, connecting all of the ribs and struts together, but allowing for the swinging movements thereof between the fully expanded condition shown in FIG. 8, and their retracted condition shown in FIG. 7, and in dotted lines on FIG. 1.

To accomplish this the ribs and the struts 6 and 6ᵃ are all provided with three sets each of bayonet slots 15 with the heads thereof disposed in a direction remote from the pivotal centers of the ribs and struts.

The connectors 14 are divided into three groups of different lengths, as seen in FIG. 8, and each individual connector comprises preferably, a short length of flexible connector such as a wire cable having a spherical or ball-like head member 14ᵃ swaged or suitably fixed on each end thereof, the diameter of the cable connectors being such as to be slidably received in the narrow portions of the bayonet slots 15 while the heads or ball members 14ᵃ are insertable through the wide or circular head portions of each of the slots 15. After each pair of the extensible connectors 14 is inserted in each of the slots in the adjacent pairs of ribs and struts (as seen in FIG. 6) the wide or circular ends of the bayonet slots are closed by any suitable means, preferably rivets 16, these rivets of course being inserted after each pair of the connectors are inserted and moved into the narrow portions of the slots 15 with the ball or head members 14ª thereof disposed at the opposite sides of the respective struts and ribs, thus limiting the expansion of the rib and strut members to said 60° probe receiving area 10.

The drogue attitude is not critical; that is, the winglet members will always be producing lift and hence a stabilizing force and continuous strut and rib extension force resisting collapse or reefing of the drogue device while the same is in its operative position in the airstream.

Briefly describing the operation, the drogue device is normally carried in a receiving receptacle or socket member on the tanker aircraft which retracts the struts and ribs substantially parallel to the airstream passing the drogue device, the drogue device being secured to the outer end of the retracted refueling hose or fuel delivery boom, this position of the drogue device and winglet members 11 being shown in FIG. 1 in dotted lines, and in FIG. 7. In this position the winglet members are disposed at substantially maximum angle of attack to the airstream.

In this position the winglet members provide substantially maximum rearward drag on the supporting ring 3, and thus on the refueling hose or boom for withdrawing the same rearwardly in the tanker and farther out into the airstream, and into fuel delivery position. The winglet members also exert maximum outward "lift" on the strut members when the struts are contracted and through the annular extensible connectors 14, the intermediate ribs 7 will also be expanded as the struts move outwardly and rearwardly upon release and rearward movement of the fuel delivery hose or boom on the tanker aircraft.

As the drogue device moves rearwardly from the tanker and the struts and ribs are no longer constrained, the "outward" lift spreads the winglets away from each other from their overlapped relation to expose the entire winglet area to the airstream passing the device, the angle of attack being reduced to substantially midway between maximum and zero angle of attack with respect to the resultant airstream passing the drogue device when the drogue device is fully expanded, but the increased area exposed to the airstream produces a very considerable drag together with outward lift, expanding the ribs and struts 7, 6 and 6ª to their maximum probe receiving area as seen in full lines in FIGS. 1 and 8.

Actual flight tests with the drogue in accordance with the invention have shown remarkable constancy which tend to produce freedom from oscillation and when connected to a trailing hose substantially eliminates any whipping or banner target effect. From tests it is concluded that the flow behind the drogue is stable and further that the presence of the probe behind the drogue does not cause the drogue to suddenly oscillate from one side to the other. For this reason no difficulty is encountered by the aircraft to be refueled in causing the probe to enter the refueling connecting device, so as to establish connection between the refueling conduit and the probe.

In addition, my improved drogue device, when extended allows the pilot to see through it to observe the exact position of the refueling boom (employed with a KC-135 Tanker Aircraft) or refueling hose (employed with a KB-50 Tanker Aircraft).

Furthermore, the winglet surfaces each offers a large impact area, and the individually pivoted strut and rib elements have an ability to individually deflect easily to absorb the kinetic energy of the drogue and hose and prevent scratching, dents, and other forms of damage experienced with other conventional types of drogues now in use.

As before mentioned the winglet drogue device, in folded or contracted condition, offers sufficient aerodynamic drag for self-ejection from storage, such as in "pods," and fuselage of the (KB-50A) tanker aircrafts and, of course, provides the required amount of drag (but not excessive), when extended, to permit the probe of the receiver to push against the tanker's receptacle locking force (that keeps the fuel from leaking) and thus permits a secure engagement so that fuel can be passed in large quantities at a high rate.

While only one embodiment of the invention has been illustrated and described, changes and modifications, which may appear to those skilled in the art, may be made without departing from the scope of the present invention, as defined by the appending claims.

I claim:

1. An aerodynamic drogue device for stabilizing the terminal portion of an aerial refueling conduit comprising an annular body member secured to the terminal portion of the conduit and concentric therewith and having a central opening therein, a plurality of separate individual airfoil members equiangularly disposed about said body member, said airfoil members each having an aspect ratio of the order of about one, each airfoil member being individually movable from a retracted position to an outward limiting radial position, the angle of attack of each airfoil member when in its outward position with respect to the resultant ambient airflow being substantially one half of the angle between the angle of zero lift and the stalling angle, said airfoil members producing a stabilizing drag on said refueling conduit, and means connecting the individual airfoil members for limiting outward movement thereof to said outward position, and means interconnecting said airfoil members and said body member to permit movement of the airfoil members from the retracted position to the outward limiting position.

2. An aerodynamic drogue device for stabilizing the terminal portion of an aerial refueling conduit comprising an annular body member secured to the terminal portion of the conduit and concentric therewith and having a central opening therein, a plurality of arms equally circumferentially spaced from each other and having their inner ends pivotally connected to said body member, said arms being movable from an inner position substantially parallel to the longitudinal axis of the body member to an extended position wherein the arms lie at an angle of the order of thirty degrees with respect to the longitudinal axis of the body member, each of said arms having a separate rigid cambered airfoil surface secured to the outer end thereof, said airfoil surfaces each having an aspect ratio of the order of one and having the chord thereof parallel to a plane containing the arm and the chord of the airfoil being positioned at an angle of the order of 45° from the longitudinal axis of the arm to which it is secured and means for limiting the outward movement of the arms to said extended position.

3. In an aerial refueling system, a drogue device therefor comprising an annular support having a central refueling axis, for the reception of a refueling probe member, a plurality of elongated strut members pivoted at one end in circumferentially spaced relation around said annular support for inward and outward radial swinging movement relative to said central refueling axis between positions substantially parallel to said axis to positions forming a conical probe receiving area surrounding said axis, a rigid individual airfoil winglet member fixed on the free end portion of each of said strut members having an aspect ratio less than 1.5, disposed for attack by the airstream passing said drogue device at an angle of attack approaching maximum when said strut members are disposed inwardly in said substantially parallel relation to said axis for producing substantially maximum drag and lift urging said strut members outwardly and directing the airstream passing said winglet members inwardly toward said axis, said airfoil winglet members movable outwardly by said strut members to positions substantially midway between maximum and zero angle of attack in the airstream passing said drogue member by outward swinging movement of said strut members, to form said conical proble receiving area surrounded by said strut members and said rigid individual airfoil winglet members and means for limiting the outward movement of said strut members to dispose said winglet members to said positions substantially midway between said maximum and zero angle of attack.

4. In an aerial refueling system, a drogue device therefor comprising an annular support having a central refueling and probe receiving axis, for the reception of a refueling probe member, a plurality of elongated strut members each pivoted at one end in circumferentially spaced relation around said annular support and said axis for inward and outward swinging movement relative to said axis between retracted positions substantially parallel to said central axis and extended positions surrounding said axis forming a conical probe receiving area, an individual rigid preformed airfoil winglet member fixed to the free end portion of each of said strut members in a position having an aspect ratio of the order of 1 disposed for attack by the resultant airstream passing said drogue device at an angle of attack of substantially 45° when said strut members are disposed inwardly in their retracted positions, said individual rigid airfoil winglet members disposed for movement by said strut members to their extended positions to a decreased angle of attack relative to the resultant airstream passing said drogue device of not less than 15°; to provide substantially maximum drag and outward force on the free ends of said strut members in their retracted positions and direct the air passing said drogue device inwardly toward said central axis, and provide material drag and individual outward force on each of said struts in their extended probe receiving positions and means flexibly connecting said elongated strut members together for limiting said outward movement of said strut members to their extended positions.

5. Apparatus as set forth in claim 4 in which each of the rigid individual preformed airfoil winglet members are substantially elliptical in plan.

6. Apparatus as set forth in claim 4, in which said rigid individual preformed winglet members are alternately disposed at two different radial distances from the pivotal centers of said strut members.

7. Apparatus as claimed in claim 4, in which said rigid individual airfoil winglet members are arranged to move into overlapping relation to each other around said axis, when said strut members are moved to said retracted positions.

8. Apparatus as set forth in claim 7, including an elongated rib member disposed intermediate each pair of said strut members, said rib members pivoted at one end to said annular support for inward and outward swinging movement relative to said axis between positions substantially parallel to said axis and positions on the included angle of said conical probe receiving area surrounding said axis, and extensible connecting means flexibly connecting said rib members and said strut members together for limiting the outward swinging movement of said strut members and rib members to the included angle of said conical probe receiving area.

9. In an aerial refueling system, a drogue device therefor comprising an annular support having a central refueling axis, for the reception of a refueling probe member, a plurality of elongated alternately disposed long and shorter strut members all pivoted at one of their ends to said annular support in uniformly circumferentially spaced relation around said central refueling axis for inward retracted and outward extended swinging movements relative to said central axis in radial planes relative to said axis, between retracted positions substantially parallel to said axis and extended positions forming a conical probe receiving area surrounding said axis; an individual rigid airfoil winglet member fixed to the free end of each of said strut members disposed in spaced relation in said extended position and in overlapping relation in said retracted position, each having an aspect ratio less than 1.5, disposed at an angle of attack by the resultant airstream passing said drogue device approaching maximum when said strut members are in their retracted positions with said winglet members in overlapping relation, said winglet members each comprising an individual rigid cambered airfoil disposed at a positive angle of attack to the airstream passing said probe device, for producing substantially maximum lift and drag on said strut members in their retracted positions for urging said strut members outwardly to said extended positions to said conical probe receiving area and directing the airstream passing said individual rigid airfoil winglet members inwardly toward said axis, said individual rigid airfoil winglet members being movable outwardly, by outward swinging movement of said strut members to the included angle of said conical probe receiving area, to displace the individual rigid airfoil winglet members in circumferentially spaced relation to each other, and decrease the angle of attack thereof on said resultant airstream passing said airfoil winglet members to an angle of attack substantially midway between maximum and zero, to provide material outward "lift" on said strut members and drag on said drogue device when said strut members are moved by said airfoil winglet members to the outer limits of the included angle of said conical probe receiving area and flexible connecting means between said strut members for limiting said outward swinging movement thereof to said included angle of said conical probe receiving area.

10. Apparatus as set forth in claim 9, including an elongated rib member disposed midway between each adjacent pair of said strut members pivoted at one end to said annular support, for similar radial outward and inward swinging movement with said strut members between their retracted inner positions substantially parallel to said resultant airstream passing said drogue device and their extended positions disposed on the included angle of said conical probe receiving area, and said flexible connecting means comprising extensible and collapsible connecting means extending around said axis, connecting all of said strut members and said rib members together, for limiting the outward swinging movements thereof to the included angle of said conical probe receiving area.

References Cited in the file of this patent

UNITED STATES PATENTS 2,960,291 Patterson _____ Nov. 15, 1960
2,998,949 Patterson _____ Sept. 5, 1961